Oct. 31, 1961     D. J. MARSHALL     3,006,404
POWER ACTUATED ADJUSTABLE CAM BEAD WEDGE TOOL
Filed Nov. 12, 1959     3 Sheets-Sheet 2

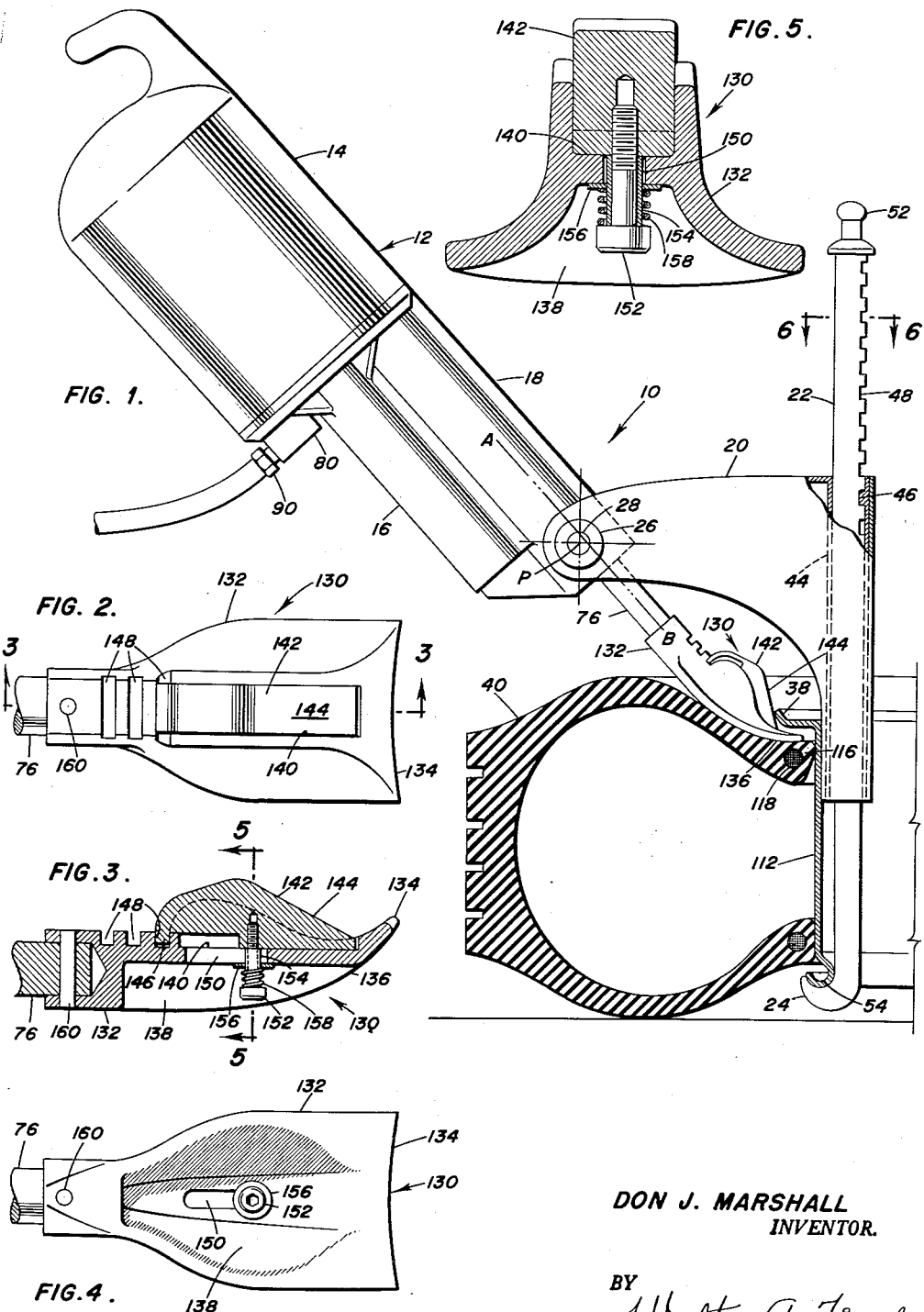

INVENTOR
Don J. Marshall
BY
Walter G. Finch
ATTORNEY

Oct. 31, 1961 D. J. MARSHALL 3,006,404
POWER ACTUATED ADJUSTABLE CAM BEAD WEDGE TOOL
Filed Nov. 12, 1959 3 Sheets-Sheet 3
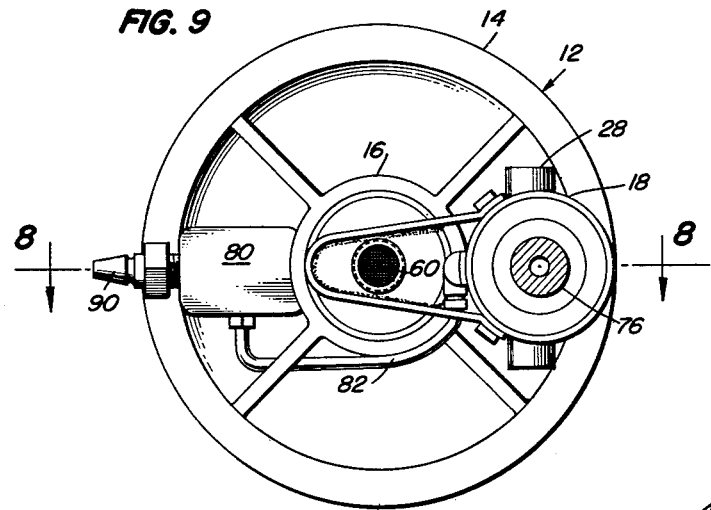
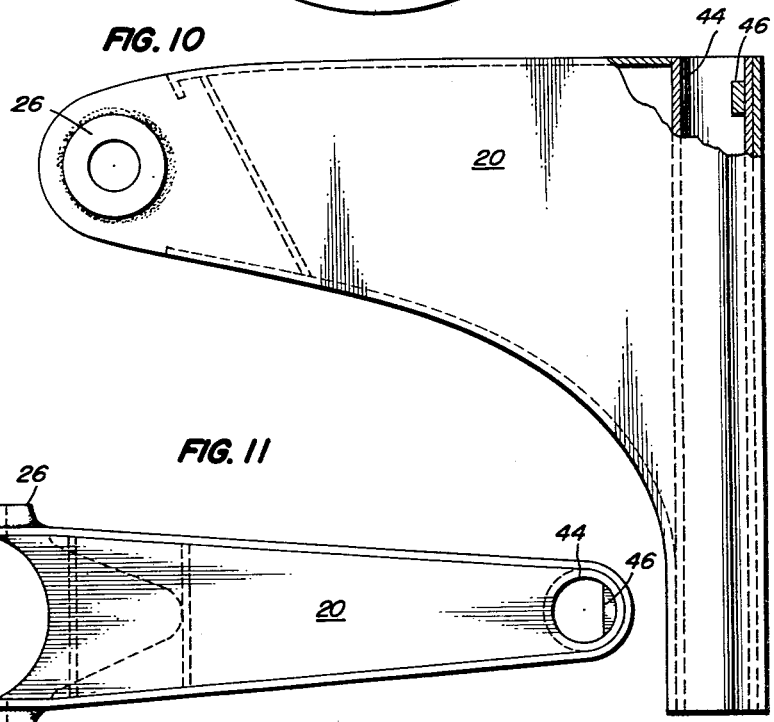
INVENTOR
Don J. Marshall
BY Walter J. Finch
ATTORNEY

United States Patent Office 3,006,404
Patented Oct. 31, 1961

3,006,404
POWER ACTUATED ADJUSTABLE CAM
BEAD WEDGE TOOL
Don J. Marshall, 3816 Granada Ave., Baltimore, Md., assignor of one-half to Marshall H. Wentz, Baltimore, Md.
Filed Nov. 12, 1959, Ser. No. 852,503
1 Claim. (Cl. 157—1.26)

This invention relates generally to wheelwright-machines, and more particularly it pertains to a power actuated adjustable cam bead wedge tool for use in removing pneumatic tires from metallic rims.

Large pneumatic tires mounted on metallic rims of large wheels for trucks, trailers, bulldozers, buses, and like vehicles, after a relatively long period of use have a tendency to become very securely bonded to such rims. This bonding of the pneumatic tire to the rim is caused by corrosion of the metal and rust which forms on such rims and adjacent the rim engaging beads of the tire.

This presents no great problem with relatively small tires, used on pleasure cars and other relatively small vehicles. However, with the large and heavy tires utilized on trucks and buses, the bonding of the tire to the rim presents a major problem and results in extremely difficult, and, at times, dangerous operations in removing the tires from the rims for repair thereof. In many instances, the bonding of a tire to a rim is so secure as to resist a pressure of several thousand pounds per square inch required to break the bond.

Many different types of apparatus and tire removing tools have been developed and used for performing the operations of removing tires from rims. Many of these conventional tire removing tools have proved completely ineffective or inefficient in removing the tires from their rims, especially where the flanges of the rims of the same or different sizes vary in width and thickness.

In addition, such conventional prior art tire removing tools have resulted in severe injury to the operators thereof. These injuries to the operators have been caused by the tools slipping or becoming detached from the tire rims during the application of rather great pressures to the tools. As a result, the dislodged tools have often struck the operators with relatively great force.

In addition to the above, many of these tire removing tools apply the removing force to the sidewall of the tire rather than to the beads thereof. Since it is well-known that the sidewall of a tire, even in the relatively large sizes utilized in trucks and buses, is relatively weak, the sidewall of the tire is, in many instances, broken and the tire is severely damaged without breaking the bond between the beads of the tire and the rim therefor.

Many of the prior art tools for performing the operation of removing the tire from the rim depend on a leverage action. Consequently, the tire and rim must be securely held to a frame or base, which, in turn, is securely attached to the floor or other part of a building. Since the force utilized in breaking the bond between the tire bead and rim is relatively great, the base of machines of this type must be relatively massive, or a secure foundation must be supplied to which the same is attached, since this base or foundation must provide sufficient strength to resist the total force exerted on the lever which is utilized to operate the machine. This, of course, materially increases the cost of the tool, both the cost of manufacture as well as installation of such a machine or tool.

As a result of the comparative failure of prior art tire removing tools utilized for removing relatively large tires from rims, it is still the common practice for such tires to be removed from the rims by purely manual labor in which pry bars and heavy sledge hammers are utilized to break the bond between the beads of the tire and the rim. In addition to the manual labor required for this operation, a relatively long period of time is consumed. The number of tires, therefore, which may be repaired and serviced by a tireman within the normal work day is materially reduced, with the cost of tire maintenance being materially increased.

A power-operated adjustable cam bead wedge portable tire removing tool which will safely and efficiently perform this operation of removing tires from rims while reducing the time required therefor, represents a real step forward in the art. From the above, it is obvious that in automotive vehicle maintenance, a power aided tool is required for the removal of heavy and truck type tires.

This invention is an improvement over the tire removing tools of applicant's U.S. Patent No. 2,728,383, issued December 27, 1955, for "Tire Bead Loosening Tool or Bead Breaking Device"; U.S. Patent No. 2,844,194, issued July 22, 1958, for "Portable Power-Operated Tire Removing Tool"; and pending U.S. patent application Serial No. 801,913, filed March 25, 1959, for "Tire Removing Tool."

It is an object of this invention, therefore, to provide a light weight and inexpensive power actuated adjustable cam bead wedge tool for use in removing tires from metallic rims of vehicle wheels.

Still another object of this invention is to provide an adjustable cam bead wedge tool for use with a handheld, pneumatically or hydraulically powered actuator for removing tires from metallic rims of wheels of vehicles.

Still another object of the invention is to provide a safe, automatic, and power actuated adjustable cam bead wedge tool for removing tires of various sizes from metallic rims and which is readily adjusted for various sizes of the flanges of tire rims and which can be quickly positioned at various points along the tire bead.

Still another object of this invention is to provide an adjustable cam bead wedge tool for use with a power operated tire removing arrangement consisting of a closed theoretical triangle of structural parts including a clevis bracket, a power-operated member connected to the adjustable cam bead wedge tool, and a hook rod to achieve a condition where all operating forces work inside of this theoretical triangle, and which, when combined with a rotating force developed by the thrust of the power-operated member connected to the adjustable cam bead wedge tool against an off-centered pivot of the triangle of structural parts forces the clevis bracket against the inner periphery of the rim of a wheel to lock the hook rod of the arrangement to the rim mounting the tire and render it impossible for the tool to kick-off from the rim when the power-operated member and adjustable cam bead wedge tool are under pressure.

These and other objects and attendant advantages of this invention will become more readily apparent and understood from the accompanying specification and drawings in which:

FIG. 1 is a side elevation of a tire removing tool arrangement, partially in cross section, showing the application of an adjustable cam bead wedge tool, incorporating features of this invention, to a rim-mounted pneumatic tire;

FIG. 2 is a top plan view of the adjustable cam bead wedge tool;

FIG. 3 is a cross-section taken along line 3—3 of FIG. 2;

FIG. 4 is a bottom plan view of the adjustable cam bead wedge tool;

FIG. 5 is a cross-section taken along line 5—5 of FIG. 3;

FIG. 9 is a bottom view of the motor assembly partially in cross-section;

FIG. 10 is an enlarged side view of a clevis bracket shown in FIG. 1, with parts thereof being broken away; and FIG. 11 is a top view of the clevis bracket of FIG. 10.

Figure 8:
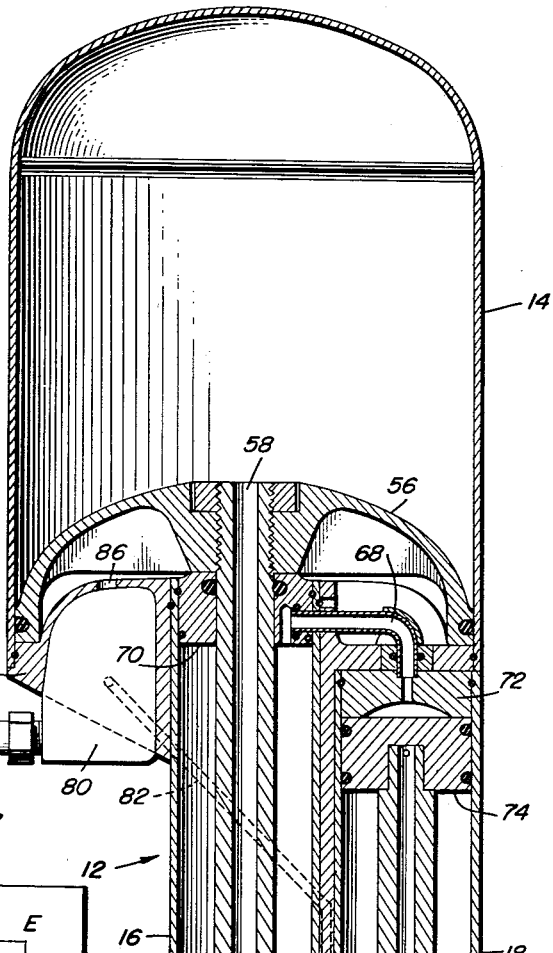
FIG. 8 is a view in section, of the actuator motor assembly shown in FIG. 9.

Referring now to FIG. 1 of the drawings, there is illustrated generally a pneumatically or hydraulically operated tire remover tool 10 which basically consists of an actuator motor assembly 12, a pivoted clevis bracket 20 and an adjustable hook rod 22. The actuator motor assembly 12 is provided with an adjustable cam bead wedge 130 at its lower end for insertion between the bead 116 of a tire 40 and an integral bead-engaging rim flange or edge 38 of a rim 112 for mounting the tire 40. The adjustable cam bead wedge 130 is used in connection with tire rim flanges 38 that vary in width and thickness, and it will be described in detail subsequently.

As shown in FIGS. 1, 10, and 11, the clevis bracket 20 is provided with clevis spring 26 and a clevis pivot pin 28 for mounting the tire remover tool 10.

The clevis bracket 20, which is illustrated in detail in FIGS. 10 and 11, is provided with a tubular sleeve 44 which provides a sliding fit for the hook rod 22. A series of notches 48, as shown in FIG. 1, are provided along the length of rod 22 to engage with a stud 46 positioned within sleeve 44.

Figure 6:
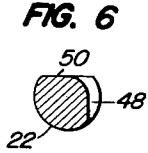
FIG. 6 is a cross-section taken along line 6—6 of FIG. 1.

By rotating the rod 22 a quarter of a turn by means of a handle 52, a flat side 50 provided lengthwise of rod 22, as shown in FIG. 6, permits unlocking of one of the notches 48 from stud 46. The rod 22 may thus be extended and relocked so that a hook 24 positioned on its opposite end can be engaged with a rounded edge 54 of the conventional tire rim 112 for the tire 40.

As shown in FIGS. 1, 8, and 9, the actuator motor assembly 12 is provided with a pneumatic cylinder 14, a master hydraulic cylinder 16, and a slave cylinder 18, all of which cooperate to multiply the force of air pressure applied to the underside of a pneumatic piston 56 for the cylinder 14. As piston 56 moves upwardly in cylinder 14, it carries the piston rod 62 of the master hydraulic cylinder 16 with it. Piston rod 62 is provided with an axial passage 58 so that the upper portion of the pneumatic cylinder 14 may be vented therethrough, and by means of a filtered aperture 60, located at the lower end of the piston rod 62, vented to the atmosphere.

Hydraulic piston 64, of the master cylinder 16, is fastened to the lower end of the master piston rod 62 by a suitable arrangement as shown, such as the use of mating threads on the piston rod 62 and the piston 64. By providing a fluid filler aperture 66, suitable hydraulic fluid can be introduced and contained within cylinder 16 above the piston 64. A hydraulic transfer tube 68, attached to the cylinder head 70 of the master cylinder 16, is arranged to communicate with a cylinder head 72 of the slave cylinder 18.

It is to be observed that the orifice leading to the transfer tube 68 is calculated for a metered flow which governs the movement of a slave piston 74 as a safety factor. The slave piston 74 contained within the slave cylinder 18 is provided with a piston rod 76. Piston rod 76 passes through a slave cylinder gland 84, and it is removably attached at its lower end to the adjustable cam bead wedge 130. Because of the effective relative sizes of the pistons 56, 64, and 74, a multiplication of force in the order of fifty times is easily obtained.

When slave piston 74 moves downwardly in its cylinder 18, the air beneath it in the slave cylinder 18 is forced out therefrom through an air passage 78 and through a return tube 82 where it is vented through a manually operated directional valve 80 to the atmosphere. This valve 80 is also arranged to direct the flow of air introduced through a compressed air supply fitting 90 so that instead of injecting compressed air into pneumatic cylinder 14 through an air passage 86 in cylinder head 88, it vents it instead to the atmosphere.

At the same time, there is a reversed flow of compressed air in passage 82 which enters the cylinder 18 below piston 74 and forces it upwardly in its cylinder. The displaced hydraulic fluid above piston 74 flows through the transfer tube 68 into the cylinder 16 to force the piston 64 downwardly in its cylinder 16 to carry the pneumatic piston 56 therewith in cylinder 14 in a retract stroke. This back and forth operation of the actuator motor assembly 12 can be repeated as often as desired by manipulating the valve 80 to extend or retract the adjustable cam bead wedge 130.

Referring again to FIG. 1, the tire removing tool 10 is shown in position on the vehicle wheel rim 112. The tool 10 is illustrated in the process of removing the tire 40 from the rim 112 by forcing the bead 116 away from the rim flange 38.

The bead 116 of the typical tire 40 is often rust-bonded to the rim flange 38 after a period of use. Because of this fact and considering the tension of a reinforcing cable 118 within the bead 116, it is necessary to apply great wedging force to break this bond when a tire 40 is to be replaced. Also due to the fact that rim flanges 38 for the same size rims 112, or rims 112 of different diameters vary in width and thickness, it is necessary to use the adjustable cam bead wedge 130 to break the bond between the bead 116 and the rim flange 38 of the rim 112. Thus, it is necessary to move the cam wedge 130 so as to vary the time at which to change the direction of drive of the actuator motor assembly 12 and its piston rod 76 from a direction substantially 90° to the rim 112 to a downwardly direction thereto.

Thus, the adjustable cam bead wedge 130 is provided at the end of a power actuator piston rod 76. As shown best in FIGS. 2 to 5, the cam wedge 130 consists of a main body casting or spade 132 which is provided with an intermediate flattened tire-forcing surface 136. An arcuate lip 134 extends at one end and the other end is socketed and secured with a pin 160 to the actuator piston rod 76.

Upon the underside which forms the forcing surface 136, there is provided a lower recess or cavity 138 more clearly shown in FIGS. 3 and 5. The top side of the spade 132 is provided with an upper slot-like cavity 140 to slidably receive a movable cam piece 142.

The cam piece 142 is formed with a forward wedge-like upper camming surface 144 and a traverse downwardly extending tongue 146 at its rear edge. A plurality of parallel spaced grooves 148 are cut across the top surface of the spade 132 to receive this tongue 146 of the movable cam piece 142 for selected lengthwise positions thereof.

As shown in FIGS. 3, 4 and 5, a lengthwise slot 150 communicates between the upper cavity 140 and lower cavity 138. A cap screw 152, having a spacing sleeve 154, passes through slot 150 and loosely captivates the cam piece 142 within its upper cavity 140. A compression coiled spring 158 and a flat washer 156 on the spacing sleeve 154 permit the lifting of the cam piece 142 when its position is to be changed, but otherwise securely retain the tongue 146 within one of the grooves 148.

The adjustable bead cam wedge 130, as described, is thus effectively used in breaking the bond between the tire bead 116 and rim flanges 38 which vary in width and thickness for tire rims 112 of the same diameter and allow the tire removing tool 10 to be moved so as to vary the time at which to change the direction of drive from straight into the rim 112 to downwardly thereto.

Figure 7:
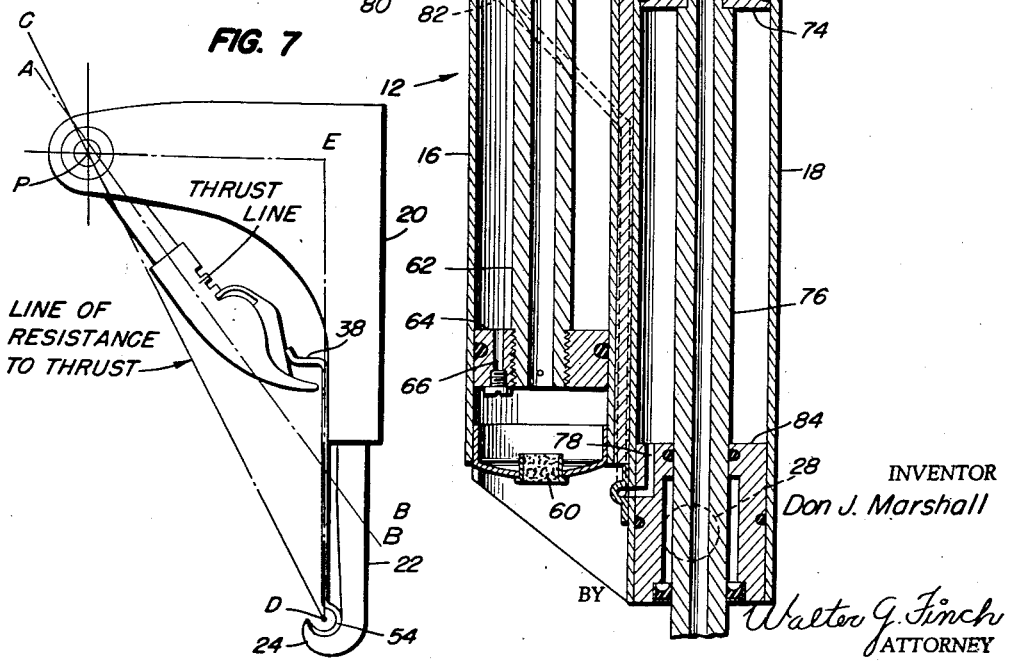
FIG. 7 is a schematic of the triangle of forces acting on the tire removing tool during operation thereof in removing a tire from a rim.

Referring now to the triangle of forces of FIG. 7, the pivotal center point P of clevis pivot pin 28 is located off the thrust line A—B of piston rod 76 toward the tire 40 to provide a safety torque action.

A rigid right triangle P—E—D exists in the structure consisting of the clevis bracket 20 and the hook rod 22. With the thrust line A—B extending within the line of resistance to thrust line P—D as shown, clevis bracket 20 tends to rotate to the left around point D, which is the center of hook 54, and thus tending to hold bracket 20 firmly against rim 112 in a self clamping action.

It can be seen that this important feature of the invention prevents a dangerous kick-off of the tool 10 which otherwise might occur due to the great force of several tons exerted by the adjustable cam bead wedge 130 against the rim 112.

While there has been described and illustrated herewith the preferred form of the invention it should be understood in the light of these teachings that within the scope of the appended claim the invention may be practiced otherwise than as specifically described.

What is claimed is:

A power-operated tool device, comprising, a substantially triangular shaped clevis bracket having a tubular passage extending therethrough at one side of said bracket, an adjustable rod slidably received in said tubular passage of said bracket and extending therethrough, said rod having a semi-circular shaped hook on one end providing a mating abutment for engaging a hook flange on a tire rim, means for releasably locking said rod in an adjusted position in said tubular passage of said bracket, said bracket having a yoke spaced from said tubular passage, an actuator motor assembly pivotally mounted in said yoke and having a thrust transmitting member connected thereto for extension and retraction thereby; in combination with means including an adjustable cam wedge positioned at the free end of said thrust transmitting member and adjustable to compensate for tire rims having bead-engaging flanges of different widths, said cam wedge including a spade shaped body having an arcuate lip at one end thereof and its other end coupled to said thrust transmitting member, said body having an intermediate flattened tire-forcing surface on the rear face thereof, said rear face having a recess provided therein, the opposite forward face of said body being provided with a slot-like cavity running lengthwise thereof, a movable cam member positioned in said cavity and arranged to move lengthwise of said body, said cam member having a forward wedgelike upper camming surface and a traverse downwardly extending tongue at its rear edge, said body having a plurality of parallel spaced grooves cut across the forward surface thereof to receive said tongue of said movable cam member for selected lengthwise positions thereof for yieldably securing said cam member in any one of said selected positions, whereby the direction of the line of thrust of said thrust transmitting member can be changed at a proper time for tire rim flanges of different sizes.

References Cited in the file of this patent

UNITED STATES PATENTS

| | | |
|---|---|---|
| 2,724,432 | Wurgler | Nov. 22, 1955 |
| 2,844,194 | Marshall | July 22, 1958 |